(12) United States Patent
Handshaw et al.

(10) Patent No.: US 11,797,793 B2
(45) Date of Patent: Oct. 24, 2023

(54) INDUSTRIAL DIGITAL BARCODE SCANNER

(71) Applicant: ZEBRA TECHNOLOGIES CORPORATION, Lincolnshire, IL (US)

(72) Inventors: Darran Michael Handshaw, Sound Beach, NY (US); Edward Barkan, Miller Place, NY (US); Mark Drzymala, Saint James, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 16/721,514

(22) Filed: Dec. 19, 2019

(65) Prior Publication Data

US 2020/0226334 A1  Jul. 16, 2020

Related U.S. Application Data

(60) Provisional application No. 62/791,420, filed on Jan. 11, 2019.

(51) Int. Cl.
  *G06K 7/10* (2006.01)
  *G06K 7/14* (2006.01)

(52) U.S. Cl.
  CPC ....... *G06K 7/10722* (2013.01); *G06K 7/1413* (2013.01)

(58) Field of Classification Search
  CPC ................................................ G06K 7/10722
  USPC .................................................. 235/462.41
  See application file for complete search history.

(56) References Cited

U.S. PATENT DOCUMENTS

| 2008/0302873 A1 | 12/2008 | Kotlarsky | |
| 2009/0230194 A1* | 9/2009 | Calderon | G06K 7/10554 |
| | | | 235/462.43 |
| 2014/0191039 A1* | 7/2014 | Pang | G06K 7/1096 |
| | | | 235/462.31 |
| 2018/0225489 A1* | 8/2018 | Liou | G06K 7/10544 |
| 2020/0257868 A1* | 8/2020 | Ryabinin | G06K 7/10821 |

FOREIGN PATENT DOCUMENTS

| EP | 0615207 A2 | 9/1994 |
| EP | 0945819 A1 | 9/1999 |

OTHER PUBLICATIONS

Preliminary Search Report for French Patent Application No. 2000203 dated Jun. 8, 2022.

* cited by examiner

*Primary Examiner* — Rafferty D Kelly
(74) *Attorney, Agent, or Firm* — Yuri Astvatsaturov

(57) ABSTRACT

A barcode scanner assembly for capturing at least one object appearing in a field of view (FOV) is provided that includes a scanner enclosure including a scanner enclosure body, a printed circuit board (PCB) at least partially disposed within the scanner enclosure, an imaging assembly coupled to the PCB, and a decode assembly positioned on the PCB. The scanner enclosure body has a top portion, a bottom portion opposite the top portion, a front portion, and a rear portion opposite the front portion and further defines an internal cavity. The PCB is positioned substantially parallel to an outbound imaging axis.

9 Claims, 10 Drawing Sheets

INDUSTRIAL DIGITAL BARCODE SCANNER

The present application claims the benefit of a provisional patent application U.S. Ser. No. 62/791,420, filed on Jan. 11, 2019, and incorporated herein by reference in its entirety.

BACKGROUND OF THE INVENTION

Barcode and other scanning devices generally capture images within a given field of view (FOV). In some instances, handheld devices may be used to capture images of objects positioned at varying distances from the device. In such environments, handheld devices may be selectively positioned by a user to assist with capturing a suitable image of the object. Such systems typically require a power and/or communication cable to provide power and/or to transfer data from the scanning device to a computing device in order to complete additional computations and/or processes. These cables oftentimes include a rigid or semi-rigid cable relief that protrudes outwardly from the scanning device, thus extending the overall footprint of the device on a work surface. Accordingly, in some examples, it may be difficult or impossible to position the devices against walls or other surfaces, thereby reducing available workspace.

Additionally, when repositioning the scanning device, the cable may impede a user's ability to comfortably grasp the device. In some instances, the cable may cause the device to become unstable if the cable is inadvertently bumped or jostled. Additionally, electronic components contained within these devices may be prone to damage via bumps and/or spills.

Accordingly, there is a need for improved systems, methods, and devices which address these issues.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
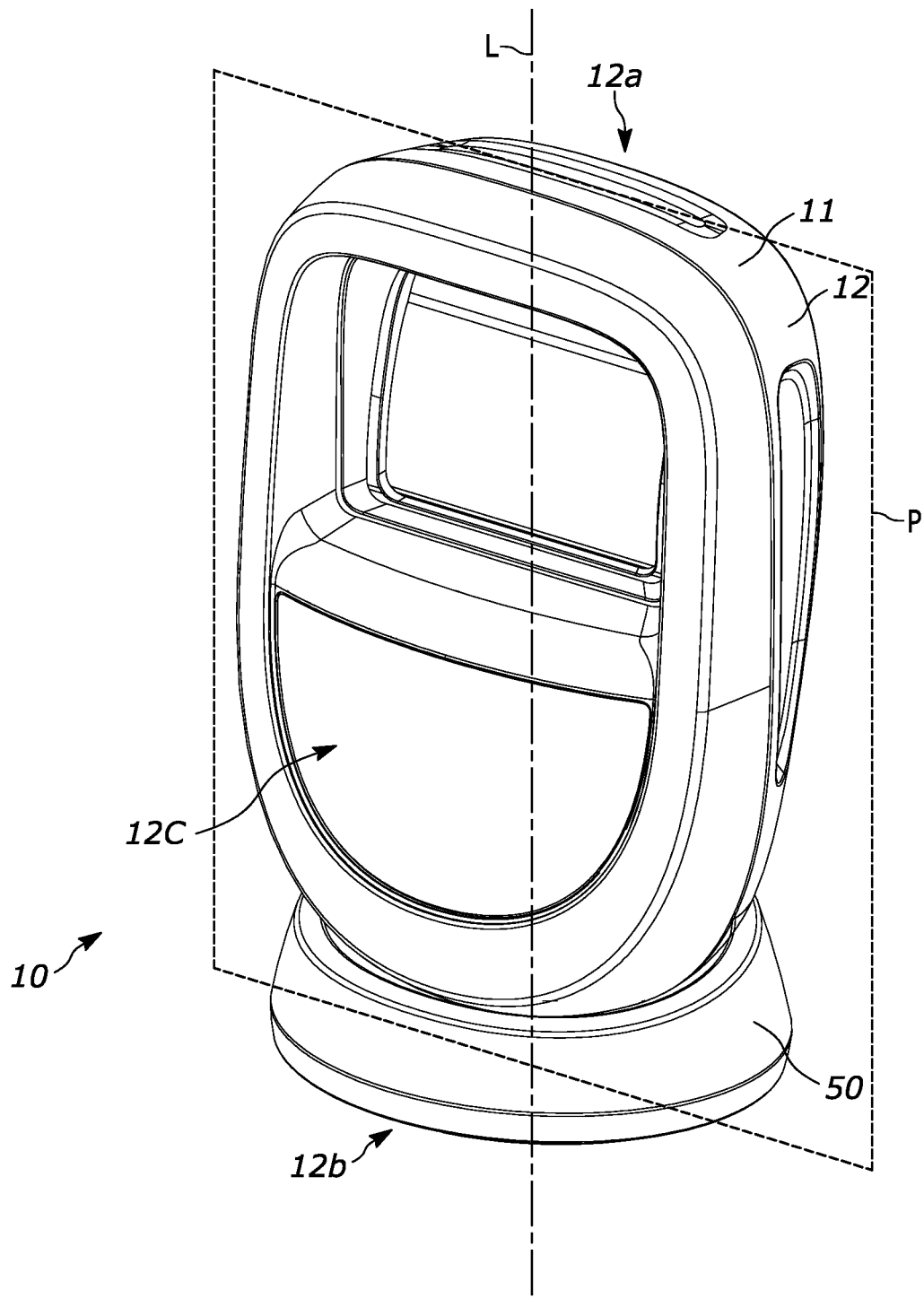
FIG. 1 is a front perspective view of a portable, handheld digital barcode scanner in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In an embodiment, the present application provides a barcode scanner assembly for capturing at least one object appearing in a field of view (FOV) is provided that includes a scanner enclosure including a scanner enclosure body, a printed circuit board (PCB) at least partially disposed within the scanner enclosure, an imaging assembly coupled to the PCB, and a decode assembly positioned on the PCB. The scanner enclosure body has a top portion, a bottom portion opposite the top portion, a front portion, and a rear portion opposite the front portion and further defines an internal cavity. The PCB is positioned substantially parallel to an outbound imaging axis. In some examples, the imaging axis is substantially perpendicular relative to a longitudinal axis of the scanner enclosure.

In some examples, the scanner assembly further includes an off-axis illumination board disposed on the top portion of the scanner enclosure body. The barcode scanner assembly may be alternately operable in at least one of a manual mode or a presentation mode.

In some examples, the rear portion of the scanner enclosure body includes an angled cutout to accommodate a communication cable that includes a connector configured to interface with the barcode scanner assembly. The communication cable may further include a strain relief member. In some aspects, a majority of the strain relief member is constrained within a volume of the scanner enclosure. The scanner enclosure body may further define a sound port positioned proximally to the angled cutout of the rear portion of the scanner enclosure to port sound outside of the scanner enclosure.

In some examples, the scanner enclosure body includes at least one internal wall configured to inhibit ingress of dust into the scanner enclosure body. The barcode scanner assembly may additionally include at least one capacitive touch sensor disposed on the printed circuit board that extends along at least one side portion of the scanner enclosure body. In some examples, the printed circuit board, the imaging assembly, and the decode assembly are at least partially disposed above a lower third of the longitudinal length of the scanner enclosure.

In another implementation, a barcode scanner assembly for capturing at least one image of an object appearing in a field of view (FOV) includes a scanner enclosure including a scanner enclosure body, a printed circuit board (PCB) at least partially disposed within the scanner enclosure, a data connector disposed on a first side of the printed circuit board, and an imaging sensor mounted one of directly or indirectly to a second side of the PCB. The scanner enclosure body has a top portion, a bottom portion opposite the top portion, a front portion, a rear portion opposite the front portion, and a longitudinal length extending form the top portion to the bottom portion and further defines an internal cavity. The PCB is disposed within a middle third of the longitudinal length of the scanner enclosure. The data connector is adapted to be engaged by an external communication cable.

In yet another implementation, a barcode scanner assembly for capturing at least one image of an object appearing in a field of view (FOV) includes a scanner enclosure including a scanner enclosure body, a printed circuit board (PCB) at least partially disposed within the scanner enclosure, and a communication cable. The scanner enclosure body has a top portion, a bottom portion opposite the top portion, a front portion, a rear portion opposite the front portion, and a longitudinal length extending form the top portion to the bottom portion and further defines a scanner perimeter. The PCB includes a data connector coupled thereto. The communication cable has a cable connector that interfaces with the data connector, and further includes a strain relief coupled to the cable connector. At least a majority of the strain relief is contained within the scanner perimeter of the scanner enclosure.

In another implementation, a barcode scanner assembly for capturing at least one image of an object appearing in a field of view (FOV) includes a scanner enclosure including a scanner enclosure body, a printed circuit board (PCB) at least partially disposed within the scanner enclosure, and a data connector disposed on a first side of the printed circuit board. The scanner enclosure body has a top portion, a bottom portion opposite the top portion, a front portion, a rear portion opposite the front portion, and a longitudinal length extending form the top portion to the bottom portion and further defines an internal cavity. The data connector provides an aperture for insertion of a data cable at an angle between approximately 40° and approximately 50° relative to the longitudinal length of the scanner enclosure.

In another implementation, a barcode scanner assembly for capturing at least one image of an object appearing in a field of view (FOV) includes a scanner enclosure including a scanner enclosure body, a printed circuit board (PCB) at least partially disposed within the scanner enclosure, and a data connector disposed on a first side of the printed circuit board. The scanner enclosure body has a front portion and a rear portion being separated by a central plane, a top portion, a bottom portion opposite the top portion, and a longitudinal length extending form the top portion to the bottom portion and further defines an internal cavity. The data connector is disposed on a first side of the PCB and is adapted to be engaged by an external communication cable. The data connector is positioned in the front portion of the scanner enclosure body.

Turning to the figures, reference numeral 10 generally identifies an imaging reader configured as a brick-shaped housing or scanner enclosure 11 including a scanner enclosure body 12 that has a top portion 12a, a bottom portion 12b opposite the top portion 12a, a front portion 12c, and a rear portion 12d opposite the front portion 12c. The scanner enclosure body 12 is in the form of a shell that defines an interior volume or cavity to accommodate any number of components to assist in capturing an image of an object. The bottom portion 12b is generally flat to accommodate placement on a substantially horizontal surface (e.g., a countertop or table). The scanner enclosure body 12 may be constructed from any number of suitable materials such as, for example, polymers and/or metallic materials. Other examples are possible.

In the illustrated example, the scanner enclosure body 12 defines a longitudinal length extending between the top portion 12a and the bottom portion 12b, and further defines a longitudinal axis "L" extending along the longitudinal length. Further, the front portion 12c and the rear portion 12d of the scanner enclosure body 12 are in the form of discrete housings that couple to each-other to form a generally enclosed unit. The front portion 12c and the rear portion 12d may be separated by a plane "P" for illustrative purposes. In some approaches, the longitudinal axis L is disposed on the plane P. In the illustrated example, the outermost bounds of the scanner enclosure body 12 define a footprint or a perimeter that extends upwardly from the bottom portion 12b of the scanner enclosure body 12.

The imaging reader 10 may additionally include a base 50 that allows for selective rotation of the enclosure body. For the sake of brevity, further details surrounding the base 50 will not be described, however it is understood that all or some of the base 50 may cooperate with the scanner enclosure 11 to define the footprint, perimeter, and/or interior volume of the imaging reader.

Figure 5:
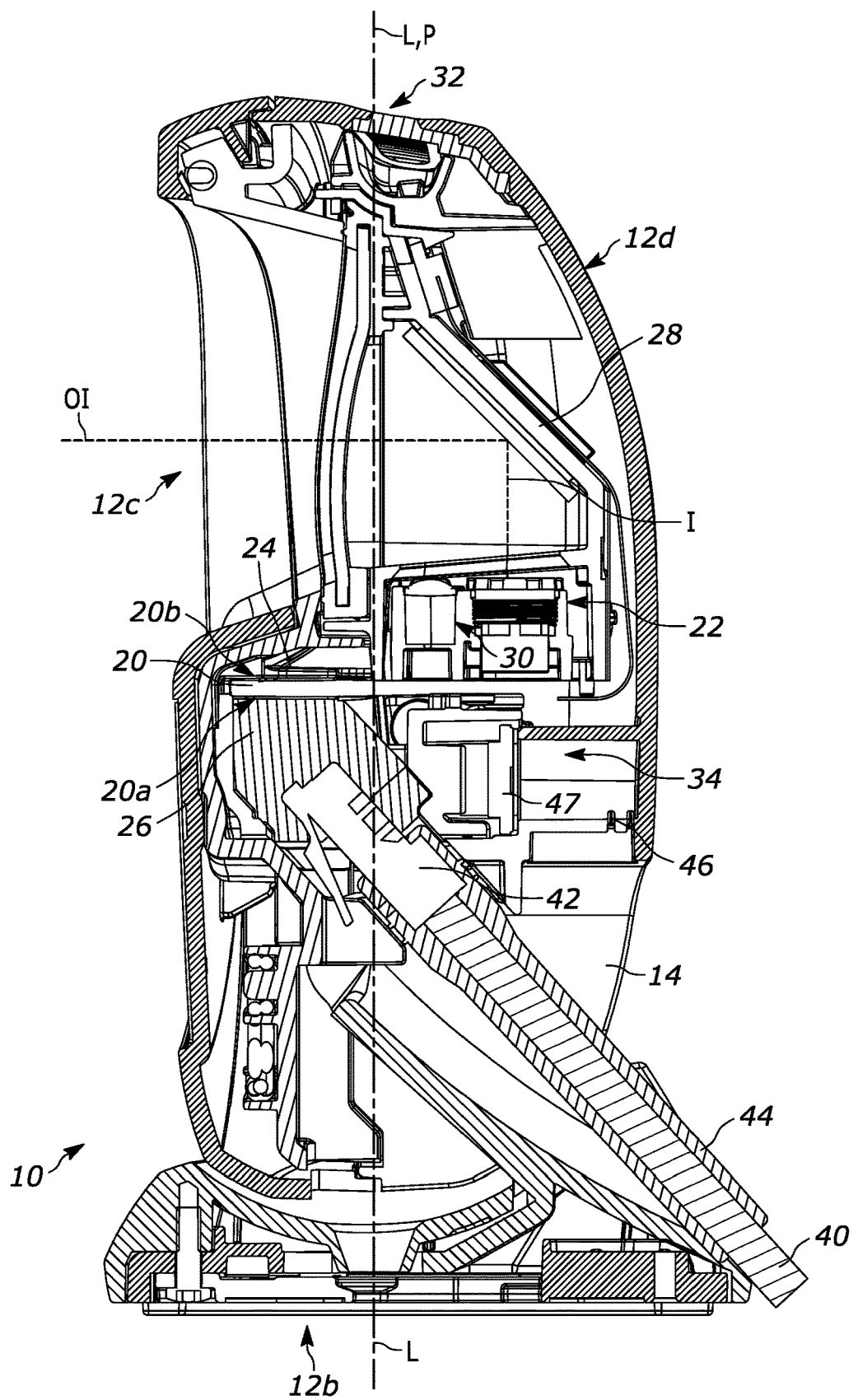
FIG. 5 is a side elevation cross-sectional view of the digital barcode scanner of FIGS. 1-4 in accordance with this disclosure.
Figure 6:
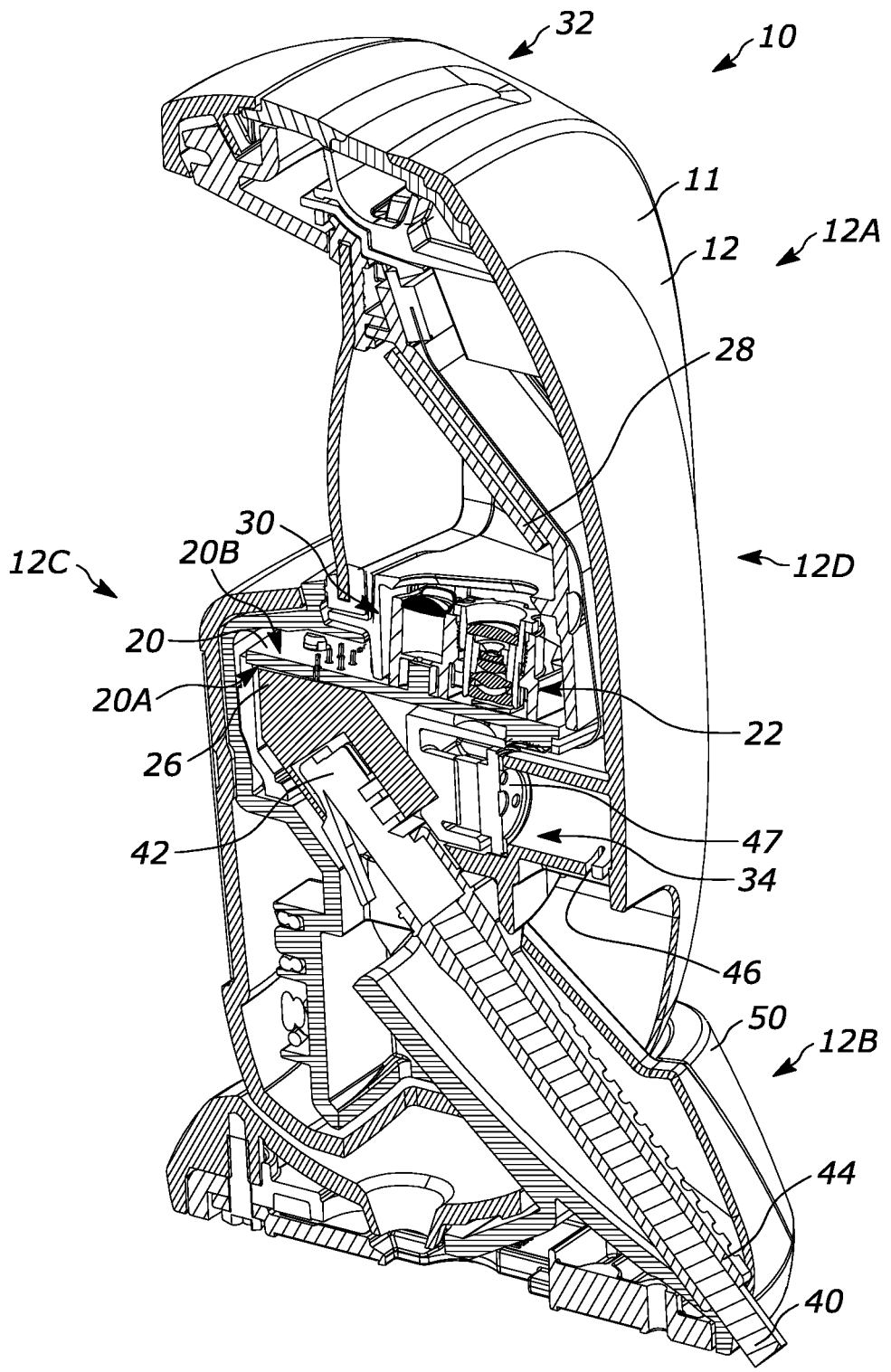
FIG. 6 is a rear perspective cross-sectional view of the digital barcode scanner of FIGS. 1-4 in accordance with this disclosure.
Figure 7:
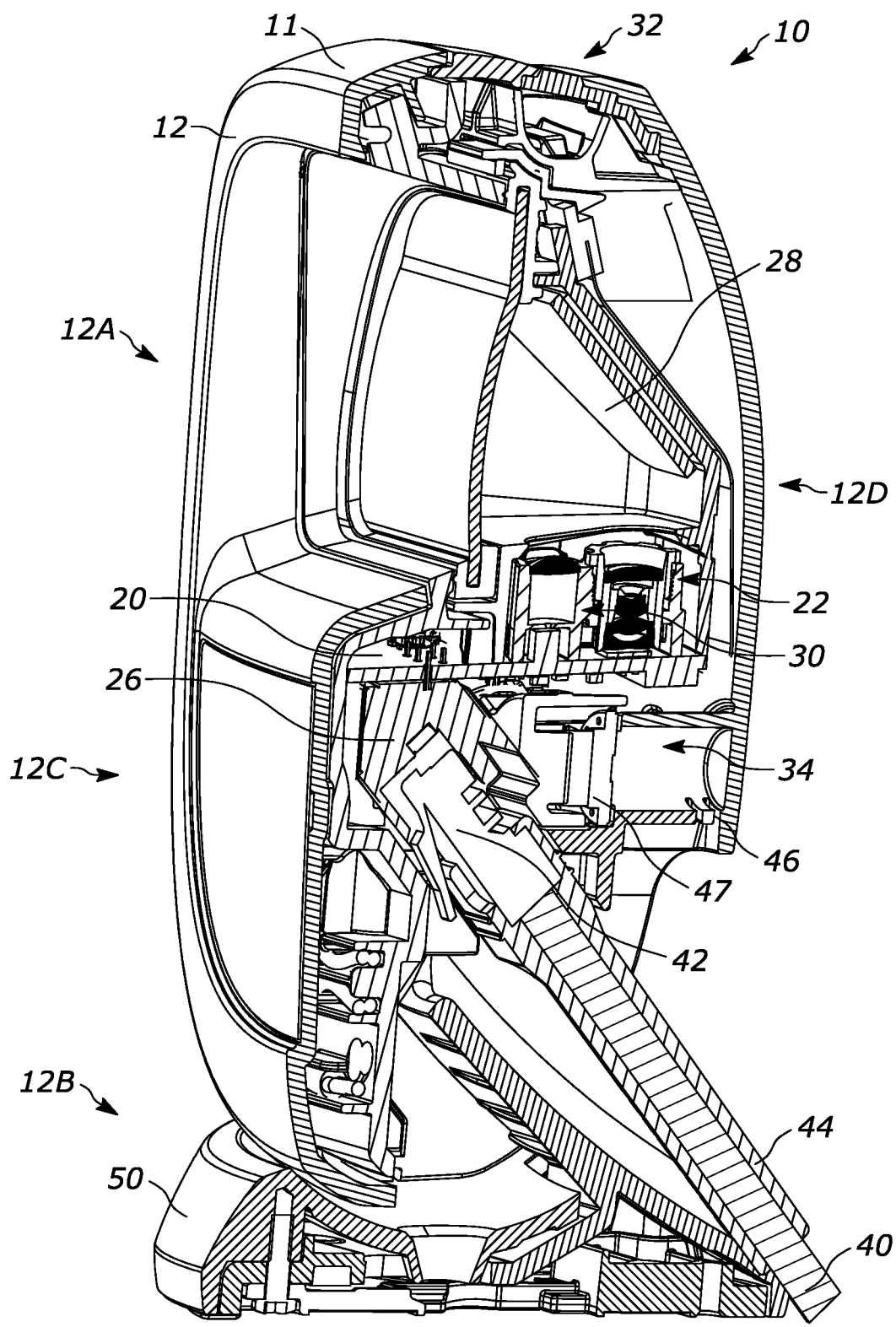
FIG. 7 is a front perspective cross-sectional view of the digital barcode scanner of FIGS. 1-4 in accordance with this disclosure.
Figure 8:
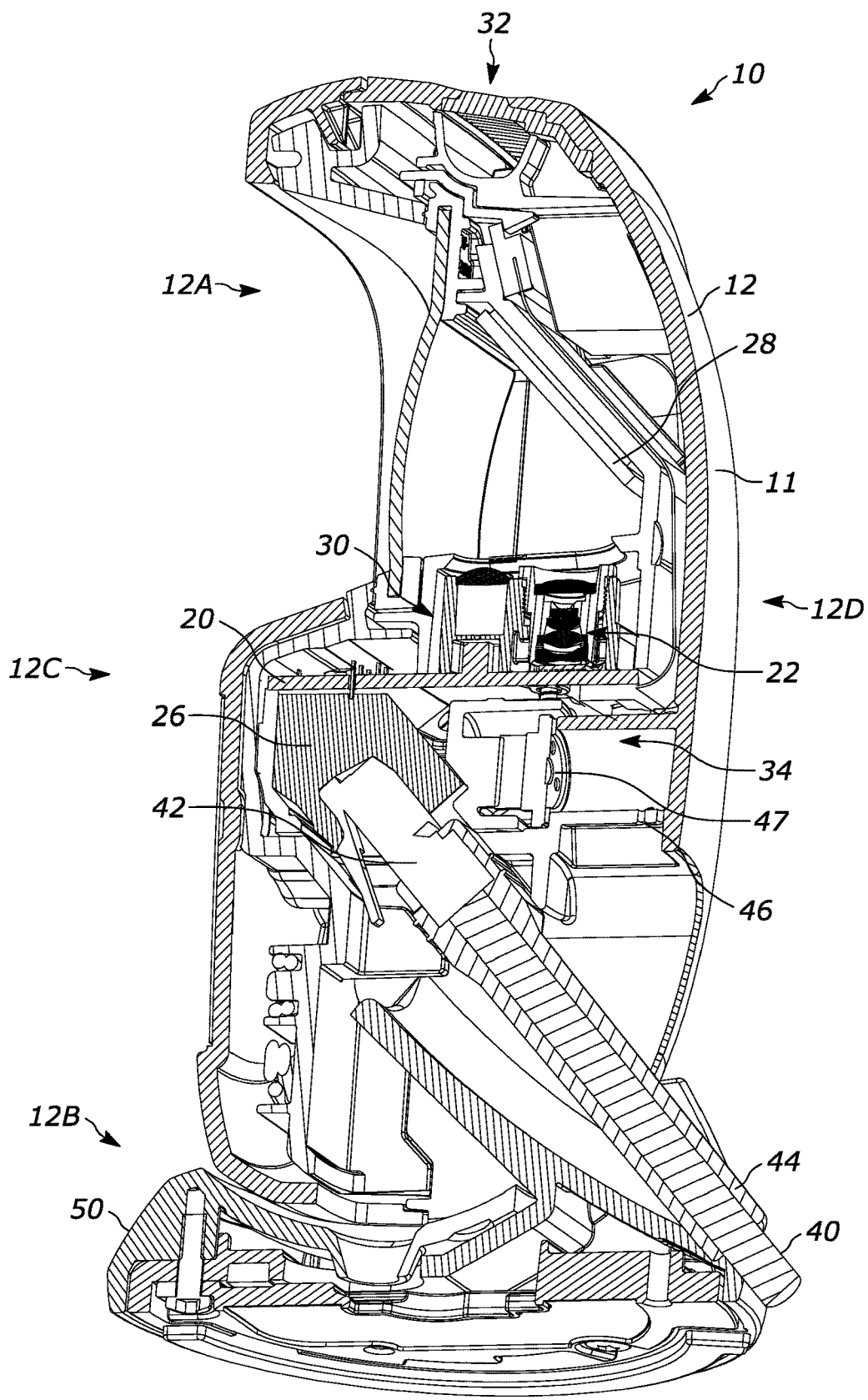
FIG. 8 is a bottom perspective cross-sectional view of the digital barcode scanner of FIGS. 1-4 in accordance with this disclosure.
Figure 9:
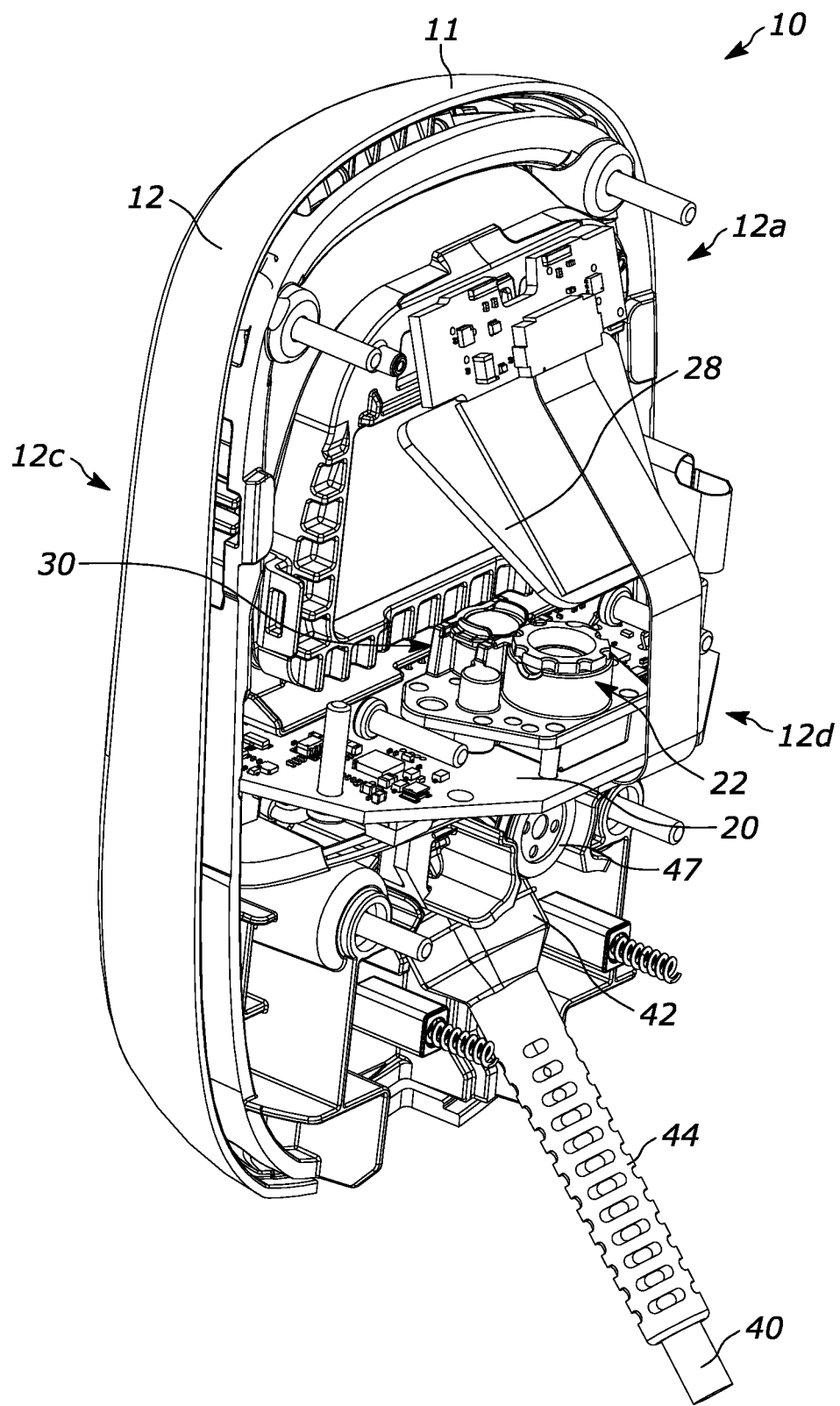
FIG. 9 is a rear perspective view of the digital barcode scanner of FIGS. 1-4 in accordance with this disclosure, with a rear housing removed.
Figure 10:
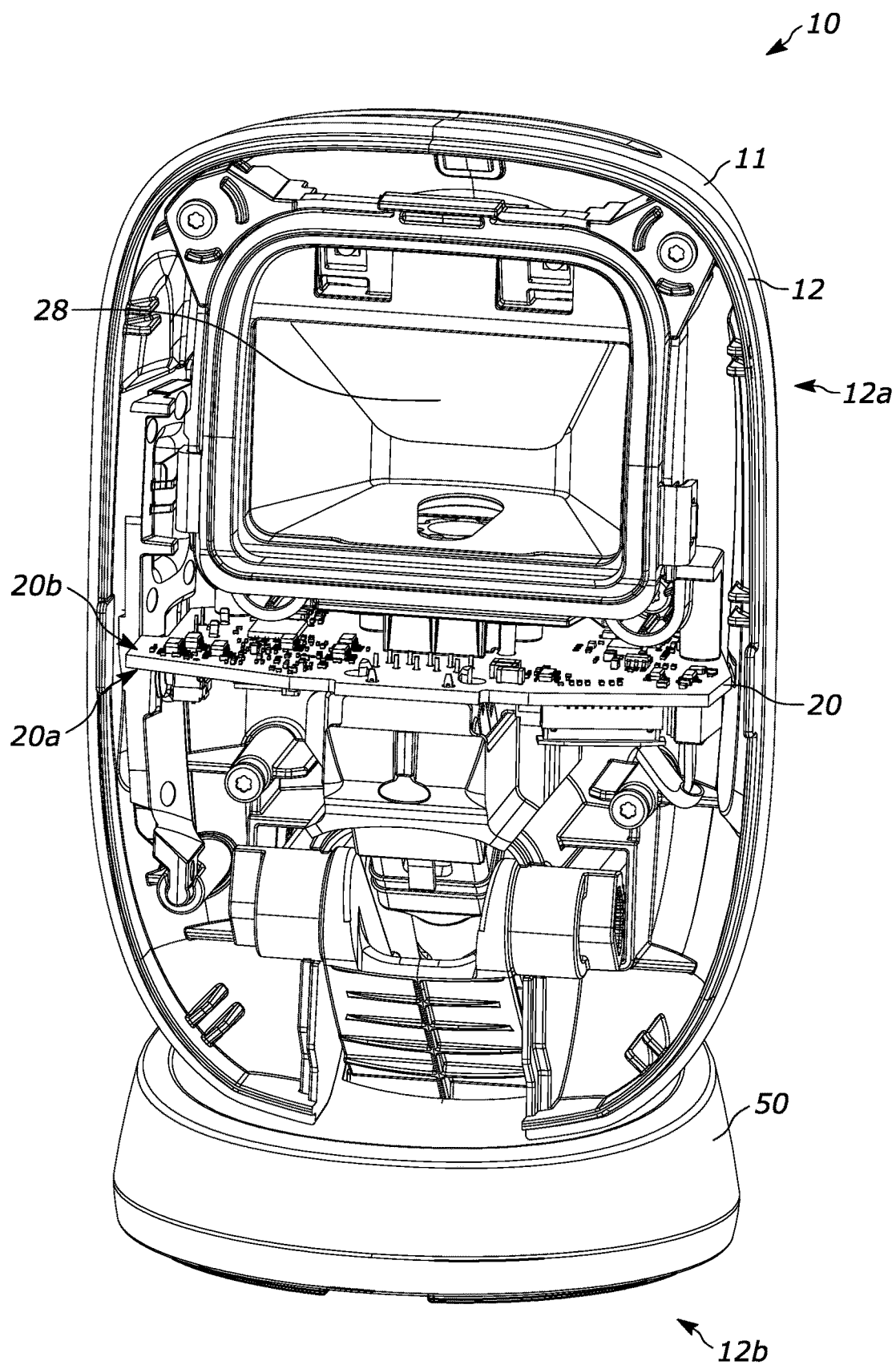
FIG. 10 is a front perspective cross-sectional view of the digital barcode scanner of FIGS. 1-4 in accordance with this disclosure, with a front housing removed.

Turning to FIG. 5, the interior volume of the scanner enclosure body 12 accommodates a number of components to assist in scanning or capturing an image of an object. Specifically, the interior volume accommodates a PCB 20 having a first side 20a and a second side 20b, an imaging assembly 22, a decoder 24, a data connector 26, a mirror assembly 28, an aiming assembly 30, an illumination assembly 32 (which may include a light pipe), and an audio assembly 34. It is appreciated that any number of additional components (e.g., an off-axis illumination board disposed in the top portion 12a, a linkage mechanism in examples where the scanner enclosure 11 is movable relative to the base 50) may be disposed within the interior volume of the scanner enclosure body 12.

In some examples, the PCB 20 may be a main board to which any and/or all of the imaging assembly 22, the decoder 24, the data connector 26, and the aiming assembly 30 secure to via a direct (e.g., a soldered or other direct) connection, but in some examples, any combination of these components may secure to the PCB 20 via an interface (e.g., via a flexible connector, an intervening socket assembly, etc.).

In the illustrated example, the PCB 20 is a generally planar element that is positioned approximately perpendicularly relative to the longitudinal axis L. The PCB 20 may be secured within the interior volume of the scanner enclosure body 12 via any number of suitable approaches. As illustrated in FIG. 5, the PCB 20 may be disposed within approximately a middle third (or alternatively, at any location above a lower third) of the longitudinal length of the scanner enclosure body 12, thus limiting potential damage incurred by foreign particles (e.g., fluids) entering into the scanner enclosure body 12. In some examples, the PCB 20 may be arranged within approximately 10° off of being perpendicular to the longitudinal axis L.

The imaging assembly 22 is coupled to the second side 20b of the PCB and can include any number of components (e.g., an imaging sensor, a lens and/or a lens array, etc.) used to capture an image. The imaging assembly 22 includes an imaging axis "I" that is substantially parallel to the longitudinal axis L of the scanner enclosure body 12. However, as illustrated in FIG. 5, the mirror assembly 28 causes the imaging axis I to turn and/or bend by approximately 90°, thus creating an outbound imaging axis "OI" that exits the front portion 12c of the scanner enclosure body 12 (via a lens and/or a window). As a result of this configuration, the PCB 20 is positioned substantially parallel relative to the outbound imaging axis OI, and the outbound imaging axis OI is substantially perpendicular relative to the longitudinal axis L of the scanner enclosure body 12.

In the illustrated example, the aiming assembly 30 is also coupled to the second side 20b of the PCB 20. The aiming assembly 30 may be positioned forward (i.e., closer to the front portion 12c) of the imaging assembly 22 and may include any number of components that assist in properly capturing a desired FOV.

The data connector 26 is coupled to the first side 20a of the PCB 20. The data connector 26 is adapted to be engaged by an external communication cable 40 that includes a connector 42 that couples to (e.g., is inserted into) the data connector 26 to interface with the imaging reader 10. The data connector 26 may include an interface or opening that is engaged by the external communication cable 40. The interface or opening at least partially faces the rear portion 12d of the scanner enclosure body 12. It is understood that the term "facing" does not require the interface or opening to face perpendicularly to the rear portion 12d of the scanner enclosure body 12, rather, the interface or opening can face the rear portion 12d of the scanner enclosure body 12 at an angle such as what is shown in the figures.

The communication cable 40 may transmit power to the imaging reader 10 and/or may transmit data to an external device. The communication cable 40 additionally includes a rigid or semi-rigid strain relief 44 adapted to relieve strain on the communication cable 40 caused by a bending and/or a pulling force.

In the illustrated example, the data connector 26 is disposed within the front portion 12c of the scanner enclosure body 12 and is angled downwardly relative to the PCB 20. In other words, all or most of the data connector 26 may be positioned forward of the plane P. In some examples, the data connector 26 provides for an aperture for insertion of the communication cable at an angle between approximately 40° and approximately 50° relative to the longitudinal length L of the scanner enclosure body 12. Other examples of suitable lengths are possible.

Figure 2:
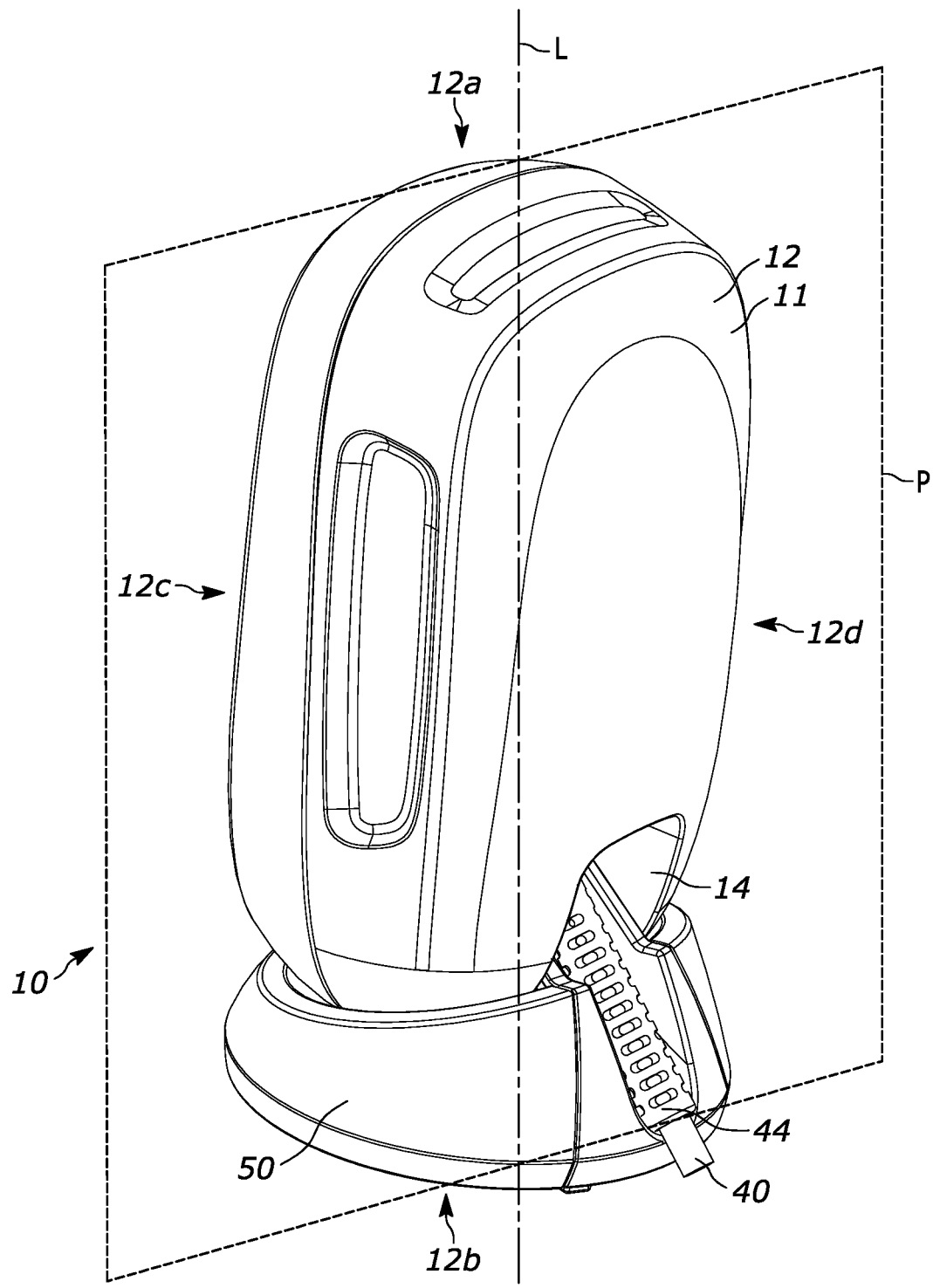
FIG. 2 is a rear perspective view of the digital barcode scanner of FIG. 1 in accordance with this disclosure.
Figure 3:
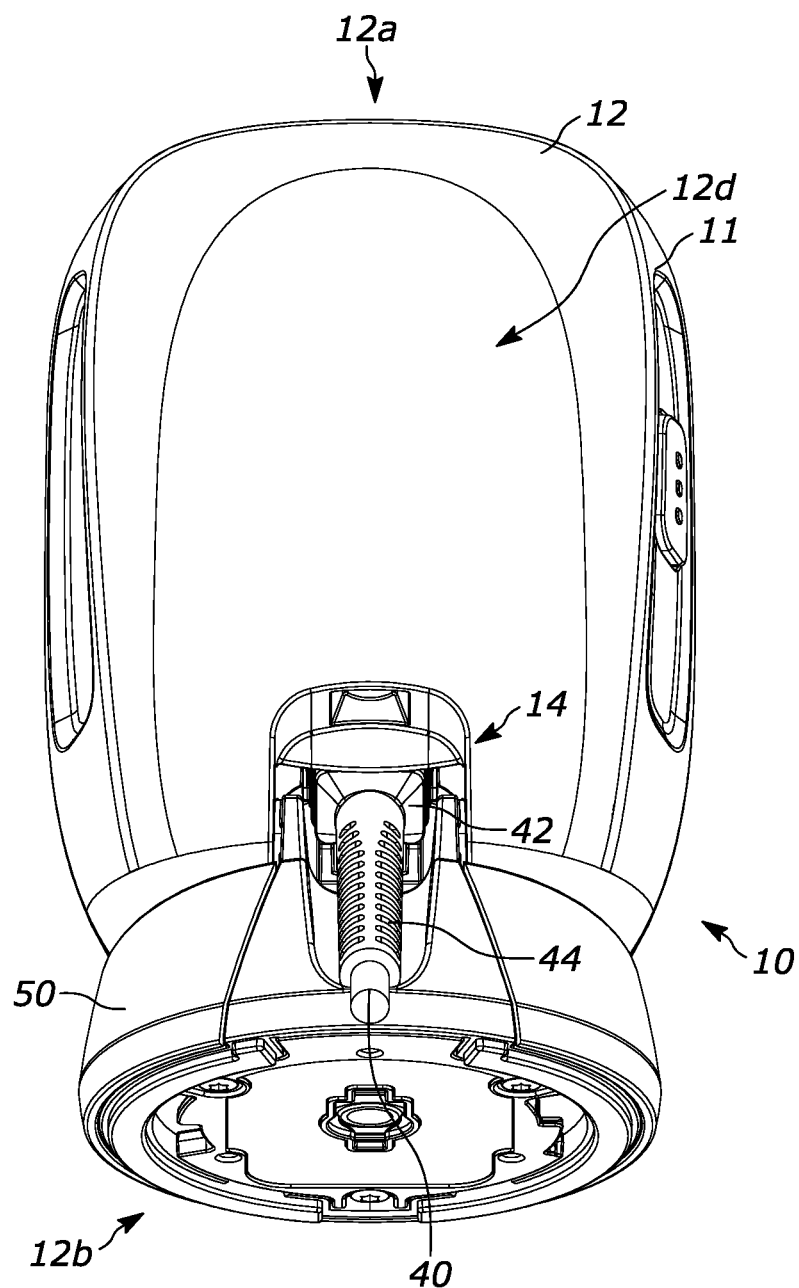
FIG. 3 is a lower rear perspective view of the digital barcode scanner of FIGS. 1 and 2 in accordance with this disclosure.
Figure 4:
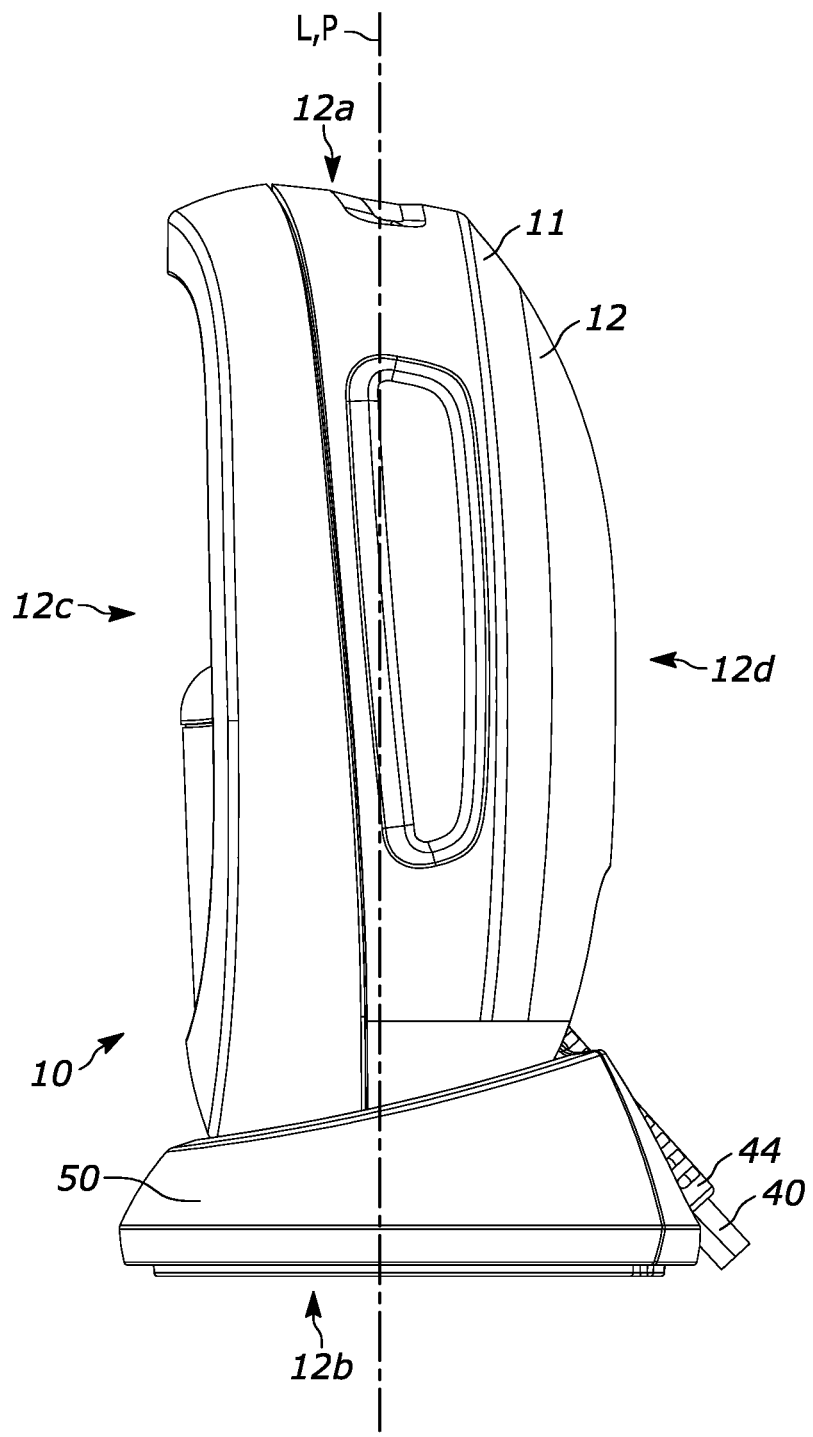
FIG. 4 is a first elevation view of the digital barcode scanner of FIGS. 1-3 in accordance with this disclosure.

As illustrated in FIGS. 2, 3, and 5, the scanner enclosure body 12, and specifically the rear portion 12d thereof, may include an angled cutout 14. The angled cutout 14 extends downwardly from the first portion 12c of the scanner enclosure body 12 to the rear portion 12d of the scanner enclosure body 12 and is generally positioned at an angle that is similar and/or identical to the downward angle of the data connector 26. The angled cutout 14 is dimensioned to accept or accommodate the communication cable 40 to allow the connector 42 thereof to be coupled to the data connector 26. The configuration of the angled cutout 14 results in an insertion angle of the communication cable 40 between approximately 30° and approximately 60° relative to the longitudinal axis L of the scanner enclosure body 12. Other examples of suitable insertion angles are possible.

As illustrated in FIGS. 2-10, the dimensions, configuration, and/or the positioning of the angled cutout 14 and the data connector 26 cause most and/or all of the strain relief 44 of the communication cable 40 to be contained within the footprint, perimeter, and/or the interior volume of the scanner enclosure 12. It is again noted that in the illustrated example, the base 50 may also account for a portion of the footprint, perimeter, and/or the interior volume of the scanner enclosure. As a result, the overall footprint of the imaging reader 10 is reduced due to the flexible nature of the remainder of the communication cable 40, thus permitting placement in an increased number of locations on the table, countertop, or other desired surface.

In some aspects, the imaging reader 10 may include any number of optional arrangements, configurations, and/or components. For example, in some approaches, the audio assembly 34 may define a sound port 46 that transmits sound generated by a speaker 47 (which in some forms may be operably coupled to the PCB 20). The sound port 46 may be defined by the rear portion 12d of the scanner enclosure body and may be in the form of a channel that is positioned proximally to the angled cutout 14 to allow sound to be transmitted to an external area of the imaging reader 10.

Further, in some examples, the scanner enclosure body 12 may inhibit ingress of dust or other objects into the interior volume. In these examples, the scanner enclosure body 12 may include at least one sealing mechanism in the form of an internal wall and/or a seal (e.g., a lap joint) to prevent unwanted objects from entering into the interior volume. Such a sealing mechanism may be positioned below the electronic components (e.g., the PCB 20, the data connector 26, the imaging assembly 22, etc.) to reduce or eliminate fluid and/or debris propagation in in a direction from the bottom portion 12b of the scanner enclosure body 12 to the top portion 12a thereof. In some embodiments, the wall separates main cavity into a number of sub-cavities. A first sub-cavity may houses or accommodates all of the electronic components of the imaging reader 10, and a second sub-cavity does not house or accommodate any electronic components of the imaging reader 10. Other examples of suitable devices and/or components are possible.

So configured, the imaging reader 10 may be grasped by a user at a number of locations along the enclosure body without risking urging or bumping the communications cable. Further, because the strain relief 44 is largely retained within the footprint of the imaging reader 10, the reader 10 may be positioned in more locations on a working surface. Additionally, if the imaging reader 10 is equipped with tilting and/or rotating capabilities, rotating the unit upwards will not result in the communication cable 40 forming a loop or "rooster tail" that protrudes from the imaging reader 10 in an unsightly manner.

Further still, because all or most of the electronic components are positioned at a relatively high location within the scanner enclosure body 12, the likelihood of damage to the imaging reader 10 by a spill or a drop is minimized due to the elimination of a direct fluid flow path (even when the device is tilted in either direction). Additionally, the generally horizontal placement of the PCB 20 allows for additional components such as capacitive touch sensors to be disposed on an end or ends of the PCB in a location where a user may naturally grip the device, thereby providing increased functionality. For example, the capacitive sensor or sensors may extend along at least one side portion of the scanner enclosure body.

In any or all of these implementations, the imaging reader 10 may be alternately operable in at least one of a manual mode or a presentation or hands-free mode. The reader 10 may be jointly lifted as a unit off the support surface, and held in an operator's hand, and used in a handheld or manual mode of operation in which a trigger mechanism is manually actuated and depressed to initiate reading of symbol/document, such as a barcode on a product, in a range of working distances relative to a window. In a presentation or hands-free mode of operation, the reader 10 is jointly mounted on the support surface in which symbol/document targets are presented in a range of working distances relative to the window for reading.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A barcode scanner assembly for capturing at least one image of an object appearing in a field of view (FOV), the barcode scanner assembly comprising:
 a scanner enclosure including a scanner enclosure body having a top portion, a bottom portion opposite the top portion, a front portion, and a rear portion opposite the front portion, the scanner enclosure body further defining an internal cavity;
 a printed circuit board at least partially disposed within the internal cavity;
 an imaging assembly coupled to the printed circuit board; and
 a decode assembly positioned on the printed circuit board;
 wherein the printed circuit board is positioned substantially parallel to an outbound imaging axis; and
 wherein:
 a lower extent of the printed circuit board is disposed above a lower third of a longitudinal length of the scanner enclosure body extending between the top portion and the bottom portion, the lower third being adjacent to the bottom portion of the scanner enclosure body;
 the front portion includes an aperture having the imaging axis pass therethrough; and the barcode scanner is configured to be operable on a working surface with the bottom portion being closer to the working surface than the top portion, wherein the rear portion of the scanner enclosure body comprises an angled cutout to accommodate a communication cable including a connector configured to interface with the barcode scanner assembly, and wherein the scanner enclosure body further defines a sound port positioned proximally to the angled cutout of the rear portion of the scanner enclosure to port sound outside of the scanner enclosure.

2. The barcode scanner assembly of claim 1, wherein the outbound imaging axis is substantially perpendicular relative to a longitudinal axis of the scanner enclosure.

3. The barcode scanner assembly of claim 1, wherein the communication cable further includes a strain relief member, wherein a majority of the strain relief member is constrained within a volume of the scanner enclosure.

4. The barcode scanner assembly of claim 1, wherein the scanner enclosure body includes at least one internal wall configured to inhibit ingress of dust into the scanner enclosure body.

5. The barcode scanner assembly of claim 1, further comprising at least one capacitive touch sensor disposed on the printed circuit board and extending along at least one side portion of the scanner enclosure body.

6. The barcode scanner assembly of claim 1, wherein the barcode scanner assembly is alternately operable in at least one of a manual mode or a presentation mode.

7. The barcode scanner assembly of claim 1, further comprising an off-axis illumination board disposed in the top portion of the scanner enclosure body.

8. The barcode scanner assembly of claim 1, wherein the imaging assembly and the decode assembly are at least partially disposed above the lower third of the longitudinal length of the scanner enclosure.

9. The barcode scanner assembly of claim 1, wherein the bottom portion includes a base portion configured to be positioned on a flat surface, wherein the front portion is substantially upright relative to the base portion and includes a window, and wherein the outbound imaging axis passes through the window.

* * * * *